(12) United States Patent
Hitchcock et al.

(10) Patent No.: US 11,590,852 B2
(45) Date of Patent: Feb. 28, 2023

(54) HINGED FLAP COVER WITH ANGLED SEAL FOR ELECTRIC VEHICLE CHARGING INLET

(71) Applicant: TE Connectivity Services GmbH, Schaffhausen (CH)

(72) Inventors: Matthew Bryan Hitchcock, Middletown, PA (US); Aaron James de Chazal, Middletown, PA (US)

(73) Assignee: TE Connectivity Solutions GmbH

( * ) Notice: Subject to any disclaimer, the term of this patent is extended or adjusted under 35 U.S.C. 154(b) by 23 days.

(21) Appl. No.: 17/237,675

(22) Filed: Apr. 22, 2021

(65) Prior Publication Data

US 2022/0340025 A1    Oct. 27, 2022

(51) Int. Cl.
*B60L 53/16*       (2019.01)
*H01R 13/52*       (2006.01)

(52) U.S. Cl.
CPC .......... *B60L 53/16* (2019.02); *H01R 13/5213* (2013.01)

(58) Field of Classification Search
CPC .... B60L 53/16; H01R 13/5213; H01R 13/447
See application file for complete search history.

(56) References Cited

U.S. PATENT DOCUMENTS

| 5,573,412 | A | * | 11/1996 | Anthony | ............ | H01R 13/6397 |
| | | | | | | 220/242 |
| 5,588,853 | A | * | 12/1996 | Anthony | ............ | H01R 13/5213 |
| | | | | | | 220/375 |
| 11,329,421 | B2 | * | 5/2022 | Chen | .................... | H01R 13/512 |

* cited by examiner

*Primary Examiner* — Tho D Ta

(57) ABSTRACT

A charging inlet for an electric vehicle (EV) includes a body defining an opening having a conductive terminal arranged therein. A sealing cover is pivotally attached to the body and is moveable between an open position exposing the opening and conductive terminal, and a closed position sealing the opening and the conductive terminal with respect to an external environment. A sealing element of the cover defines a sealing plug including an angled sealing rib defined about an outer periphery thereof. The sealing plug and sealing rib are configured to engage with the opening of inlet body for sealing the opening with the cover in the closed position.

23 Claims, 3 Drawing Sheets

HINGED FLAP COVER WITH ANGLED SEAL FOR ELECTRIC VEHICLE CHARGING INLET

FIELD OF THE INVENTION

The present disclosure relates to electric vehicle (EV) charging receptacles or inlets, and more specifically, to improved systems for selectively sealing the conductive terminals of an EV charging inlet.

BACKGROUND

Electric vehicles (EVs) are increasing in popularity as their practicality and usability improves. In order to fulfill consumer performance demands for both personal and commercial applications, these still-early systems must to continuously optimized to extract maximum performance, usability and convenience. One critical aspect of EV usability includes the ability to consistently charge the batteries of an EV as quickly as possible over the life of the vehicle. In this way, it is desired to minimize any degradations in charging performance. Charging performance can be affected by any number of factors, including moisture, dirt and other debris contaminating and/or degrading the electrical terminals or contacts of the charger plug or the socket/receptacle of the EV. Accordingly, it is desired to shield these sensitive surfaces from the outside environment whenever possible.

This desire has resulted in, for example, the implementation of covers arranged over the charging socket(s) of the inlet, which may be removed during charging operations to expose the socket and permit plug engagement therewith. These covers, however, have proven ineffective against the long-term buildup of contaminants on the receptacles, and moreover, are unnecessarily bulky, complex and/or expensive to manufacture. By way of further example, many of today's EVs are fitted with combined charging systems (CCSs), or systems which permit both traditional AC-based charging, as well as DC-based "fast" charging. However, each of these charging systems necessitates the use of its own plug configuration, for example, a Type 1 or Type 2 connection for AC charging, and a second two-pin DC connector for fast charging operations. Accordingly, modern interface standards include so-called combination configurations which include a Type 1 connector or a Type 2 connector, as well as a two-pin DC connector, arranged together on a single inlet. In use, however, depending on the type of charging plug being used, a vehicle being charged with its AC charging system, and thus its Type 1 or Type 2 connector fitted with a corresponding plug, may leave the two-pin DC connectors exposed, or vise-versa, during the charging operation. During charging, the unused portion of the socket is exposed to dirt, dust, moisture (e.g., rain) and other unwanted debris. Likewise, vehicles may be subject to severe use, including prolonged exposure to significant moisture such as when crossing a waterway during off-road use, or when subject to flooding conditions. Such exposures can negatively affect charging performance as contaminants are built up over the life of the vehicle, or may more immediately impact the reliability of the vehicle in the case of submersion. As set forth above, prior art covers have proven inadequate in preventing the build-up of debris and/or sealing these types of connectors under all conditions.

Accordingly, there is a need for improved systems and methods for sealing the charging inlet.

SUMMARY

In one embodiment of the present disclosure a charging inlet for an electric vehicle (EV) having a terminal sealing cover is provided. The inlet includes a body defining an opening having a conductive terminal arranged therein. The sealing cover is pivotally attached to the body and moveable between an open position, exposing the opening and the conductive terminal, and a closed position, sealing the opening and the conductive terminal with respect to the external environment. A sealing element defining a sealing plug extends from the cover and includes an angled sealing rib formed about an outer periphery thereof. The sealing rib is configured to sealingly engage with the opening for sealing the opening with the cover in the closed position.

According to another embodiment of the present disclosure, a sealing cover for an EV charging inlet is provided. The cover includes a body having a mounting end configured to pivotally mount to the charging inlet. A sealing element is received within a seal receiving space of the cover and comprises at least one sealing plug extending from a base thereof. The sealing plug includes an angled sealing rib extending about an outer periphery thereof in a non-coaxial orientation. The sealing rib and sealing plug are configured to sealingly engage with a terminal opening of the charging inlet with the cover in a closed position.

BRIEF DESCRIPTION OF THE DRAWINGS

The invention will now be described by way of example with reference to the accompanying Figures, of which.

DETAILED DESCRIPTION OF THE EMBODIMENTS

Figure 1A:
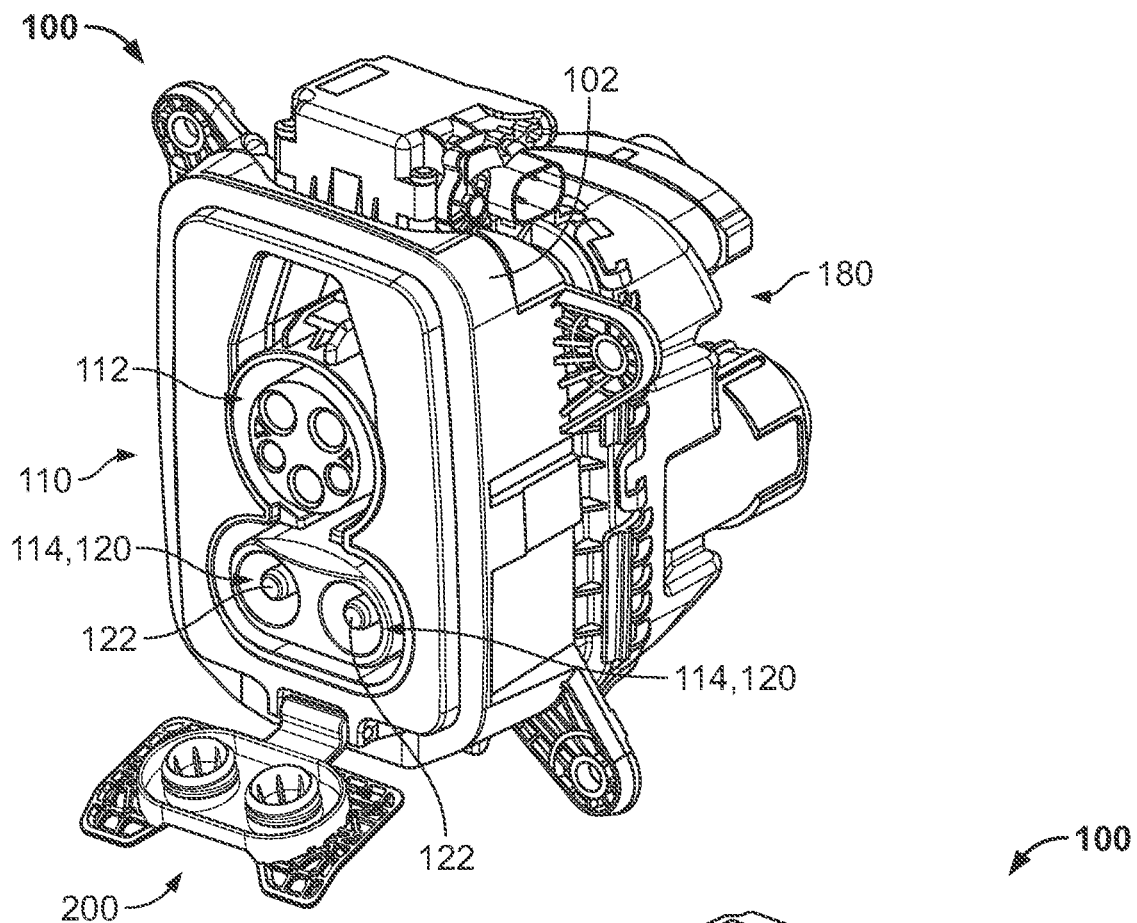
FIG. 1A is a perspective view of a combination EV charging inlet having a cover and an associated sealing gasket fitted thereto according to an embodiment of the present disclosure in an open position.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include improved covers for sealing one or more sockets of an EV charging inlet. In one embodiment, the cover is moveably (e.g., pivotally) mounted to a housing, and moveable or rotatable between a closed position and an open or charging position. The cover includes at least one sealing element sized to engage an opening of the inlet in a sealing manner. The sealing element includes a sealing rib adapted to engage with or contact a sidewall of the opening of the inlet for generating a seal therewith. The sealing rib is angled such that, as the cover is rotated into the closed position, the sealing rib engages or contacts the end of the opening simultaneously about its entire periphery, despite being introduced into the opening in an angular manner (i.e., not introduced or inserted along an axis of the opening). In one embodiment, the cover is specifically configured to seal two-pin openings associated with a DC charging socket of a combination charging receptacle. In this way, these openings remained sealed from dust and other debris, during charging of the vehicle via the AC socket.

Figure 1B:
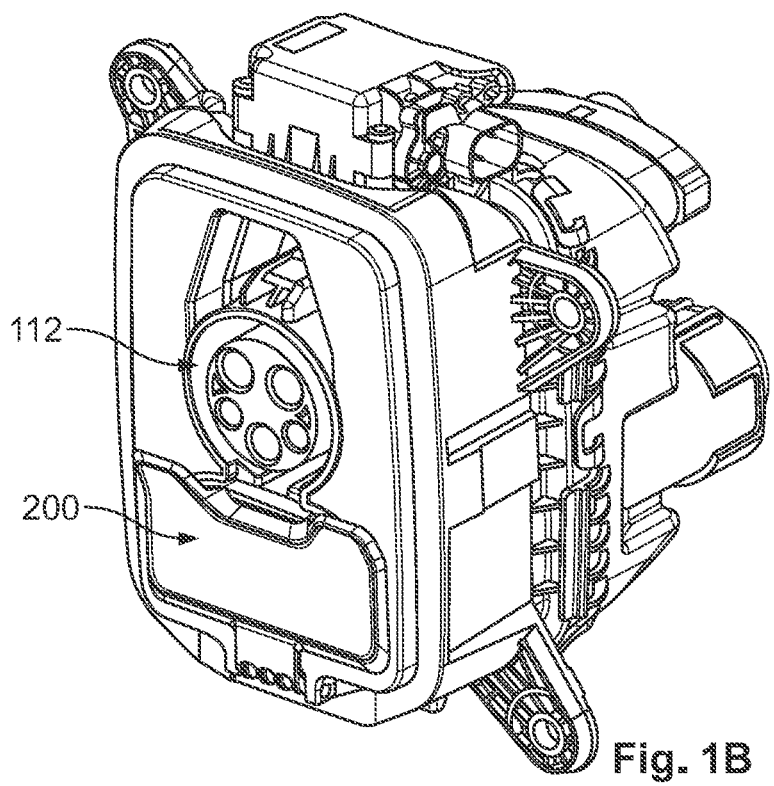
FIG. 1B is a perspective view of the charging inlet of FIG. 1A with the cover in a closed position.

Referring to FIGS. 1A and 1B, a vehicle-side charging port assembly or inlet 100 includes a housing 102 defining a charging interface or input side 110, and a vehicle interface side 180. In use, the charging interface side 110 may be oriented generally vertically and facing generally outward from a body of the vehicle, with access thereto provided via a door or cover provided on the vehicle body. The charging interface side 110 defines one or more charging receptacle or sockets, such as the exemplary combination socket including a first socket 112 configured as an AC charging socket (in the exemplary illustration, a Type-2 socket), and a second two-pin DC charging socket 114 defining first and second opening 120 having respective conductive terminal pins 122 arranged therein. The exemplary inlet 100 further includes a cover 200 for selectively sealing the DC charging socket 114. The cover 200 is hingedly mounted to the housing 102, by way of non-limiting example, generally to a bottom side thereof. The cover 200 is rotatable between an open position as shown in FIG. 1A, and a closed position as shown in FIG. 1B.

Figure 2:
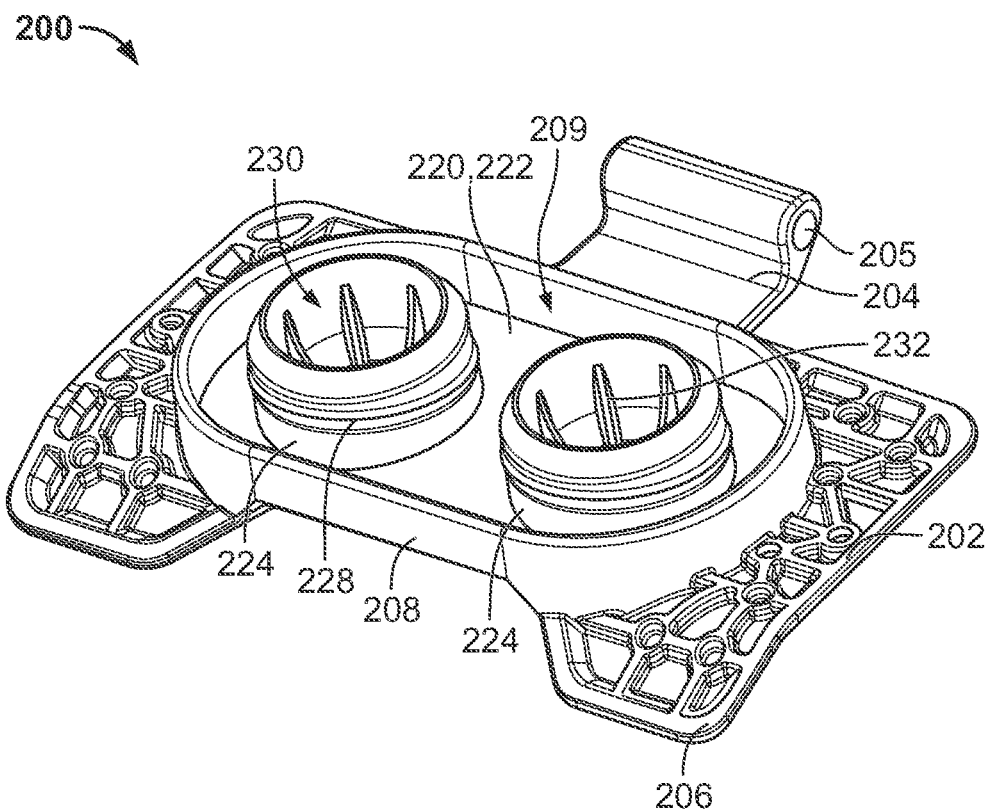
FIG. 2 is a perspective view of the cover and the sealing gasket according to the embodiment of FIGS. 1A and 1B.
Figure 3:
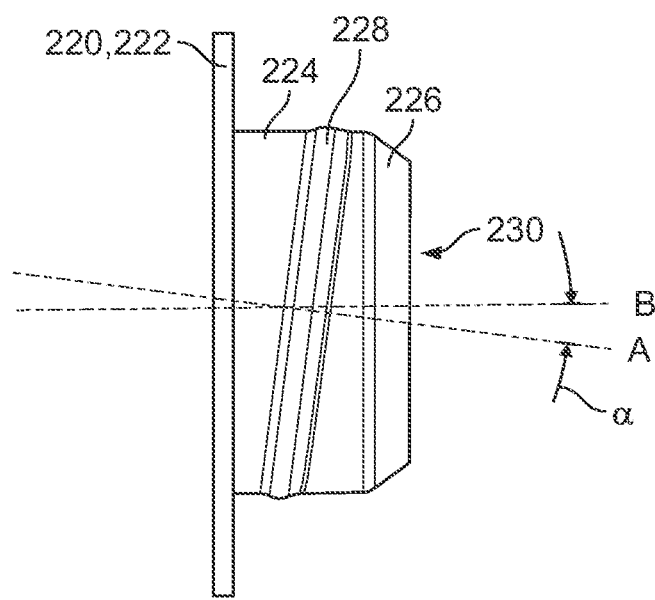
FIG. 3 is a side view of the sealing gasket shown in FIG. 2.

Referring generally to FIGS. 1A, 2 and 3, the cover 200 includes a main body 202, a mounting portion 204 defining, for example, a hinge embodied in part as a through hole 205 for receiving an axle about which the body may be rotated when connected to the housing 102. A free end of the main body 202 opposite the mounting portion 204 includes one or more tabs 206 extending obliquely therefrom and in a direction generally outwardly from the housing 102 in the closed position of the cover, as shown in FIG. 1B. In this way, the tabs 206 function as gripping or prying surfaces, facilitating the opening of the cover 200 from the closed position by, for example, one or more fingers of a user. Moreover, the free space defined laterally between the tabs 206 provides clearance for a charging plug to interface with the first socket 112 with the cover in the closed position.

Figure 4:
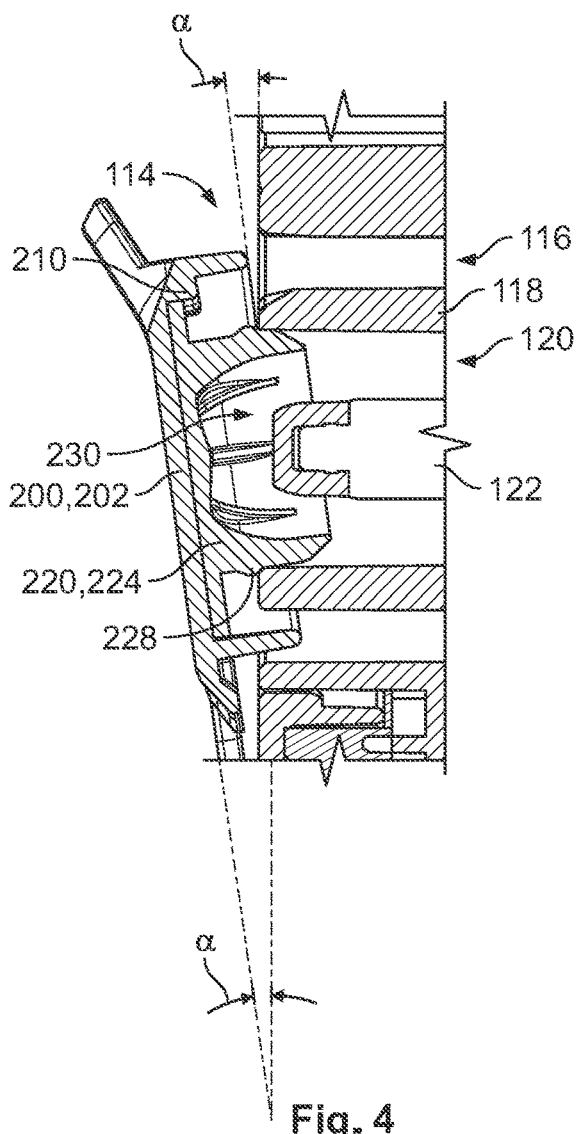
FIG. 4 is a partial cross-sectional view of the cover and charging inlet of the preceding figures in a partially closed or partially fitted position.
Figure 5:
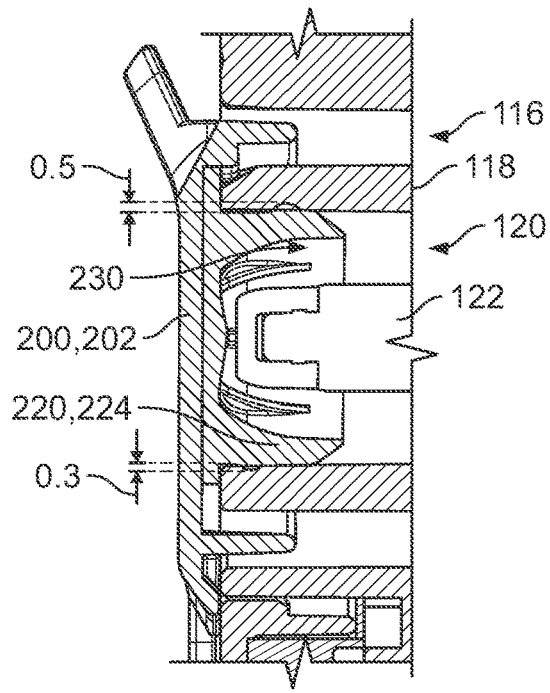
FIG. 5 is a partial cross-sectional view of the cover and charging inlet of FIG. 4 in the closed or fitted position.

As is more clearly shown in FIG. 2, the cover 200 includes a continuous circumferential wall 208 extending from a primary surface of the body 202 and defines a seal-receiving space 209 therein configured to receive one or more sealing elements, such as sealing element 220. The wall 208 is sized to be received within a corresponding circumferential opening 116 defined in a mating face of the socket 114 or housing 102, as shown in FIGS. 4 and 5. As further shown in FIGS. 4 and 5, the wall 208 defines a step 210 formed on an interior side thereof and on a side opposite the hinged connection or mounting portion 204.

Referring again to FIGS. 2 and 3, the sealing element 220 includes a base 222, in the exemplary embodiment, a generally oval-shaped base corresponding in size to the seal-receiving space 209. Two sealing glands or sealing plugs 224 are formed on the base 222 and protrude or extend in a direction generally perpendicular from a primary surface or face of the base. Each sealing plug 224 may comprise a generally cylindrical profile or body defining an at least partially hollow free end and corresponding receiving space 230. The cylindrical body of the sealing plug 224 comprises an annular tapered free end or tip 226 having an outer diameter smaller than that of a diameter of a remainder of the plug body. The tapered free end 226 provides clearance for its uninhibited introduction into the annular or ring-shaped aperture 120 formed in the inlet at an angle α resulting from the pivoting nature of the cover connection, as can be visualized in FIG. 4. Each sealing plug 224 further includes one or more stiffening ribs 232 formed on the interior wall(s) of the receiving space 230. The ribs 232 are adapted to stiffen the annular wall of the body of the plug 224, and ultimately improve its sealing characteristics in an installed position thereof.

Still referring to FIGS. 2 and 3, each sealing plug 224 includes at least one sealing rib 228 defined on or around an exterior circumference of the cylindrical body portion. In one embodiment, the sealing rib 228 is arranged radially about the exterior of the cylindrical body in an angled or non-coaxial manner. More specifically, the sealing rib 228 may be formed such that its central axis A is not parallel or not coaxial with a central axis B defining the cylindrical body of the sealing plug 224. In the exemplary embodiment shown in FIG. 3, the central axis of the sealing rib A is oriented at a predetermined angle α, for example 5 to 15 degrees, or preferably 8 degrees, with respect to the central axis of the cylindrical portion B of the plug 224. However, in other embodiments, the predetermined angle α can be defined at any angle that is non-parallel to the central axis B. In one embodiment, the central axis of the sealing rib A and the central axis of the cylindrical portion B reside in a common vertical plane bisecting each element and extending in an axial direction. It should be understood that, with the cover 200 in the closed position as shown in FIG. 5, a plane or axis bisecting the sealing rib 228 may extend through the through hole 205 or pivoting axis of the cover. In other embodiments, the pivoting axis of the cover 200 may be arranged, for example, vertically and on a side of the housing 102 such that the cover opens and closes laterally. In this instance, the central axis of the sealing rib A and the central axis of the cylindrical portion B may reside in a common horizontal plane bisecting each element and extending in an axial direction.

The sealing rib 228 is angled such that the portion of the sealing rib closest to the base 222 of the sealing element 220 in the axial direction of the sealing plug 224 is positioned closest or most proximate to the pivoting axis of the mounting portion 204 of the cover 200. Likewise, the portion of the sealing rib 228 furthest from the base 222 in the axial direction of the sealing plug 224 is positioned most distally or furthest from pivoting axis of the mounting portion 20 or hinged connection, or on a portion of the diameter of the cylindrical portion opposite the hinged side of the cover. In this way, the predetermined angle α defined between the axis of the sealing plug 224 and the axis of the sealing rib 228 is such that as the cover 200 is moved from an open position to a closed position along an arcuate path, the sealing rib contacts the wall 118 of the socket 114 generally simultaneously about its entire circumference or perimeter, despite the sealing element 220 or plug 224 being introduced into the socket at an angle. As shown most clearly in FIG. 4, the cover 200 is oriented at the predetermined angle α relative to the housing 102 after initial contact between the sealing rib 228 and the socket 114. In this way, the offset angle α of the sealing rib 228 is configured to match the angle of the cover 200 relative to the interface side 110 at the point the sealing rib first makes contact with the socket 114 as it is moved from the open position to the closed position. More specifically, the sealing rib 228 may comprise a generally semi-circular or arcuate profile having a first or leading inclined surface, a peak or crest, and a second declining surface. As shown in FIG. 4, the leading inclined or ramped surface of the sealing rib 228 initially contacts the socket 114 simultaneously about its perimeter, after which the sealing rib 228 may be compressed during further insertion as a seal with the socket 114 is formed generally in the peak or crest region as the cover 200 is moved into the closed position.

This arrangement provides numerous benefits over prior art arrangements. Specifically, the angled sealing rib 228 enables contemporaneous and uniform compression of the sealing rib against the socket wall 118 during the insertion or closing operation. This improves sealing characteristics, as well as seal life by more uniformly distributing forces, and preventing excess deformation of each sealing plug 224 and rib 228 as they are introduced into the corresponding openings 120. Further, this arrangement prevents incomplete or incidental partial closures of the cover 200, as well as offers a tactile improvement to a user, as the force to fully compress the sealing rib 228 into frictional engagement with the aperture 120 is more clearly discernable.

In the closed or installed state shown in FIG. 5, the receiving space 230 of the plug 224 receives the terminal pin 122 of the socket 114 therein, preventing its exposure to the elements via the seal formed between the sealing rib 228 and the wall 118. It should be understood that once inserted, the sealing rib 228 defines a friction-fit connection with the annular wall 118, preventing accidental or inadvertent opening of the cover 200, while retaining the seal therebetween. Still referring to FIG. 5, the sealing rib may comprise a varying height, or varying radial protruding distance from the outer surface of the body of the sealing plug 224. Specifically, the height (e.g., 0.3 mm) of the sealing rib 228 in the radial direction at the bottom of the sealing rib 228 nearest the pivoting axis of the mounting portion 204 of the cover 200 may be less than the height (e.g., 0.5 mm) of the portion of the sealing rib furthest from the base 222 in the axial direction of the sealing plug 224. This arrangement evens the required insertion force about the sealing plug 224 as a result of the pivoting nature of the cover 200 and its initial angular orientation as it is first introduced into socket 114.

While the cover 200 and associated sealing element 220 are described throughout as being attached to a bottom of the inlet housing 102, it should be understood that embodiments of the present disclosure include covers attachable to any side, or in any relative orientation, to the inlet or socket which they are configured to cover. Likewise, embodiments have been described herein as applied to a cover for a DC charging socket. However, it should be understood that covers described herein may be adapted to be used for any type of charging port or socket, without departing from the scope of the present disclosure. For example, a similar cover having angled sealing features according to embodiments of the preset disclosure may be adapted for use with the first or AC-type sockets in addition to the DC charging socket.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A charging inlet, comprising:
a body defining an opening having a conductive terminal arranged therein;
a sealing cover attached to the body and moveable between an open position, wherein the conductive terminal is exposed, and a closed position, wherein the opening and the conductive terminal are sealed with respect to the external environment, the sealing cover including a sealing element extending from the sealing cover and having a sealing rib formed about an outer periphery thereof for engaging with an interior sidewall of the opening, the sealing cover is moved between the open position and the closed position along an arcuate path, the sealing rib is oriented at an angle with respect to an exterior surface of the sealing element.

2. The charging inlet of claim 1, wherein the sealing element defines a sealing plug, and wherein the sealing rib comprises an annular rib defined about a central axis that is not coaxial with a central axis of the plug.

3. The charging inlet of claim 2, wherein the body defines a pair of DC charging terminals, and wherein the sealing element defines a first sealing plug and a second sealing plug for engaging with respective openings of each of the charging terminals.

4. The charging inlet of claim 2, wherein the sealing plug comprises a cylindrical protrusion, wherein a sealing rib is formed about an outer circumference of the plug.

5. The charging inlet of claim 2, wherein the central axis of the sealing rib and the central axis of the plug are oriented on a common plane.

6. The charging inlet of claim 2, wherein the sealing element comprises a base, and a first sealing plug and a second sealing plug extending from the base.

7. The charging inlet of claim 2, wherein an end of the sealing plug is tapered about its circumference.

8. The charging inlet of claim 2, wherein the sealing plug comprises a hollow interior space open on a first end thereof for receiving the terminal in the closed position of the sealing cover.

9. The charging inlet of claim 8, wherein the sealing plug comprises plurality of stiffening ribs defined within the hollow interior space and extending in an axial direction of the plug.

10. The charging inlet of claim 1, wherein the sealing rib is angled with respect to the sealing element such that the sealing rib simultaneously engages about its entire circumference with a circumferential wall defining the opening as the sealing cover is moved from the open position into the closed position.

11. The charging inlet of claim 10, wherein the sealing cover is rotatably attached to the body via a hinged connection, wherein the sealing rib is angled such that it is oriented closer to the sealing cover on a side proximate the hinged connection than on a side of the sealing cover opposite the hinged connection.

12. The charging inlet of claim 10, wherein the sealing rib extends radially from the sealing element to a first height on a first side of sealing element and extends radially from the sealing element to a second height, greater than the first height, on a second side of the sealing element opposite the first side.

13. A sealing cover for a charging inlet of an electric vehicle (EV), comprising:
   a body having a mounting end configured to pivotally attach to the charging inlet and defining a seal-receiving space; and
   a sealing element received within the seal-receiving space of the body and comprising:
      a base;
      a sealing plug extending from the base; and
      an angled sealing rib formed about an outer periphery of the sealing plug, the sealing plug and sealing rib configured to form a seal with a terminal opening of the charging inlet in a closed position of the sealing cover, the sealing rib comprises an annular rib defined about a central axis that is not parallel with a central axis of the sealing plug.

14. The sealing cover of claim 13, wherein the sealing rib extends radially from the sealing plug to a first height on a first side of sealing plug and extends radially from the sealing plug to a second height, greater than the first height, on a second side of the sealing plug opposite the first side.

15. The sealing cover of claim 13, wherein the body includes a circumferential wall defining the seal-receiving space.

16. The sealing cover of claim 13, wherein the sealing plug comprises a hollow interior space open on a first end thereof, wherein the sealing plug comprises plurality of stiffening ribs within the hollow interior space and extending in an axial direction of the plug.

17. The sealing cover of claim 13, wherein the sealing rib is angled such that it is oriented closer to the sealing cover on a side proximate the mounting end than on a side of the sealing cover opposite the mounting end.

18. A charging inlet, comprising:
   a body defining an opening having a conductive terminal arranged therein;
   a sealing cover attached to the body and moveable between an open position, wherein the conductive terminal is exposed, and a closed position, wherein the opening and the conductive terminal are sealed with respect to the external environment, the sealing cover including a sealing element extending from the sealing cover and having a sealing rib formed about an outer periphery thereof for engaging with an interior sidewall of the opening, the sealing cover is moved between the open position and the closed position along an arcuate path, the sealing rib is angled with respect to the sealing element such that the sealing rib simultaneously engages about its entire circumference with a circumferential wall defining the opening as the sealing cover is moved from the open position into the closed position.

19. The charging inlet of claim 18, wherein the sealing cover is rotatably attached to the body via a hinged connection, wherein the sealing rib is angled such that it is oriented closer to the sealing cover on a side proximate the hinged connection than on a side of the sealing cover opposite the hinged connection.

20. The charging inlet of claim 18, wherein the sealing rib extends radially from the sealing element to a first height on a first side of sealing element and extends radially from the sealing element to a second height, greater than the first height, on a second side of the sealing element opposite the first side.

21. A sealing cover for a charging inlet of an electric vehicle (EV), comprising:
   a body having a mounting end configured to pivotally attach to the charging inlet and defining a seal-receiving space; and
   a sealing element received within the seal-receiving space of the body and comprising:
      a base;
      a sealing plug extending from the base; and
      an angled sealing rib formed about an outer periphery of the sealing plug, the sealing plug and sealing rib configured to form a seal with a terminal opening of the charging inlet in a closed position of the sealing cover, the sealing rib extends radially from the sealing plug to a first height on a first side of sealing plug and extends radially from the sealing plug to a second height, greater than the first height, on a second side of the sealing plug opposite the first side.

22. A sealing cover for a charging inlet of an electric vehicle (EV), comprising:
   a body having a mounting end configured to pivotally attach to the charging inlet and defining a seal-receiving space; and
   a sealing element received within the seal-receiving space of the body and comprising:
      a base;
      a sealing plug extending from the base, the sealing plug comprises a hollow interior space open on a first end thereof, the sealing plug comprises a plurality of stiffening ribs within the hollow interior space and extending in an axial direction of the plug; and
      an angled sealing rib formed about an outer periphery of the sealing plug, the sealing plug and sealing rib configured to form a seal with a terminal opening of the charging inlet in a closed position of the sealing cover.

23. A sealing cover for a charging inlet of an electric vehicle (EV), comprising:
   a body having a mounting end configured to pivotally attach to the charging inlet and defining a seal-receiving space; and
   a sealing element received within the seal-receiving space of the body and comprising:
      a base;
      a sealing plug extending from the base; and
      an angled sealing rib formed about an outer periphery of the sealing plug, the sealing plug and sealing rib configured to form a seal with a terminal opening of the charging inlet in a closed position of the sealing cover, the sealing rib is angled such that it is oriented closer to the sealing cover on a side proximate the mounting end than on a side of the sealing cover opposite the mounting end.

* * * * *